(12) United States Patent
Herrmann

(10) Patent No.: US 7,331,610 B2
(45) Date of Patent: Feb. 19, 2008

(54) BELT HEIGHT ADJUSTMENT DEVICE

(75) Inventor: Thomas Herrmann, Illerkirchberg (DE)

(73) Assignee: Takata-Petri (ULM) GmbH, Ulm (DE)

( * ) Notice: Subject to any disclaimer, the term of this patent is extended or adjusted under 35 U.S.C. 154(b) by 419 days.

(21) Appl. No.: 10/786,167

(22) Filed: Feb. 26, 2004

(65) Prior Publication Data

US 2004/0256851 A1    Dec. 23, 2004

(30) Foreign Application Priority Data

Feb. 26, 2003    (DE) .................. 103 09 696

(51) Int. Cl.
*B60R 22/195*    (2006.01)

(52) U.S. Cl. .................. 280/806; 280/801.1; 280/808; 297/480

(58) Field of Classification Search ................ 280/806, 280/801.1, 808; 297/480
See application file for complete search history.

(56) References Cited

U.S. PATENT DOCUMENTS

| | | | | |
|---|---|---|---|---|
| 3,855,487 A | * | 12/1974 | Boisseau ..................... | 310/80 |
| 4,152,025 A | * | 5/1979 | Bendler et al. ............. | 297/470 |
| 4,166,642 A | * | 9/1979 | Jahn et al. .................. | 280/806 |
| 4,173,357 A | * | 11/1979 | Jahn et al. ............... | 280/801.2 |
| 4,846,498 A | * | 7/1989 | Fohl ........................ | 280/801.2 |
| 4,881,757 A | * | 11/1989 | Takada ...................... | 280/804 |
| 4,884,825 A | * | 12/1989 | Grunewald et al. ......... | 280/806 |
| 5,294,150 A | * | 3/1994 | Steffens, Jr. ............. | 280/801.2 |
| 5,295,714 A | * | 3/1994 | Fohl .......................... | 280/806 |
| 5,374,110 A | * | 12/1994 | Hiramatsu ................. | 297/480 |
| 5,516,188 A | * | 5/1996 | Bruhnke et al. ........... | 297/129 |
| 5,553,890 A | * | 9/1996 | B uhr et al. ................ | 280/806 |
| 6,336,664 B1 | * | 1/2002 | Roder ....................... | 280/806 |
| 6,450,435 B2 | * | 9/2002 | Junker et al. ............... | 242/374 |
| 6,454,306 B1 | * | 9/2002 | Cunningham et al. ...... | 280/806 |
| 6,527,298 B2 | * | 3/2003 | Kopetzky ................... | 280/806 |
| 2002/0047256 A1 | | 4/2002 | Kopetzky | |
| 2002/0159916 A1 | | 10/2002 | Whitby et al. | |
| 2004/0000783 A1 | | 1/2004 | Biller et al. | |
| 2006/0249946 A1 | * | 11/2006 | Bachmann et al. ......... | 280/806 |

FOREIGN PATENT DOCUMENTS

| | | | |
|---|---|---|---|
| DE | 2 304 878 A | | 8/1974 |
| DE | 4020600 | * | 1/1991 |
| DE | 199 57 794 A1 | | 8/2001 |
| DE | 100 21 382 A1 | | 11/2001 |
| DE | 101 19 810 A1 | | 10/2002 |
| DE | 10119810 | * | 10/2002 |
| DE | 20209965 | * | 10/2002 |
| DE | 202 09 965 U1 | | 12/2002 |

* cited by examiner

*Primary Examiner*—Paul N. Dickson
*Assistant Examiner*—Timothy Wilhelm
(74) *Attorney, Agent, or Firm*—Foley and Lardner LLP

(57) ABSTRACT

A height-adjustable, belt-deflecting device for a seat belt including a deflecting element which deflects the seat belt. The device improves the safety of a vehicle occupant to be secured and protected by the seat belt. This is achieved by the having a deflecting element connected to a tightening device with which the seat belt can be tightened.

16 Claims, 3 Drawing Sheets

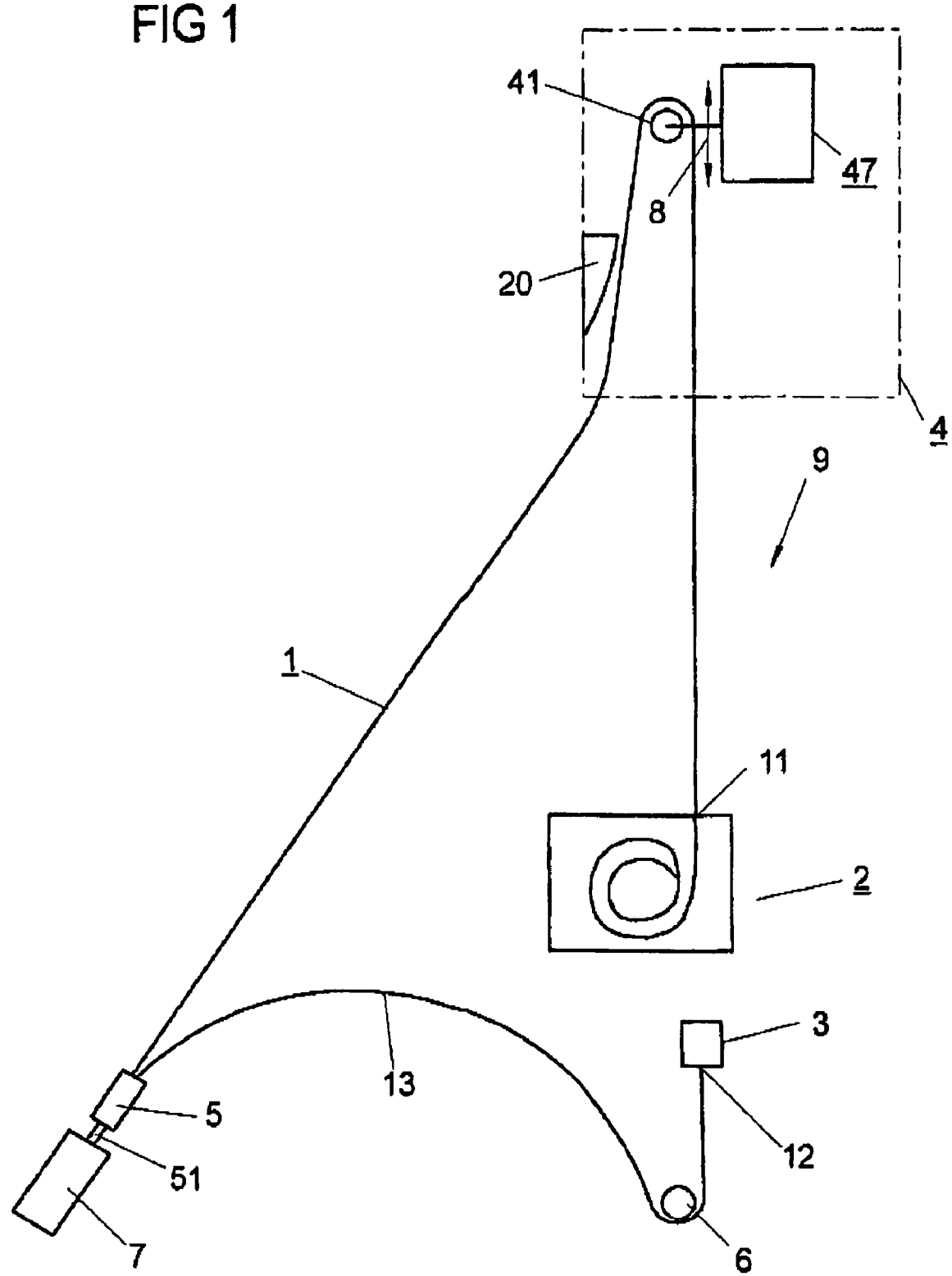

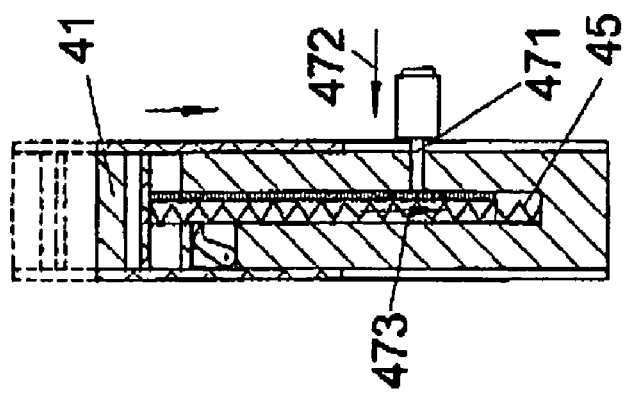
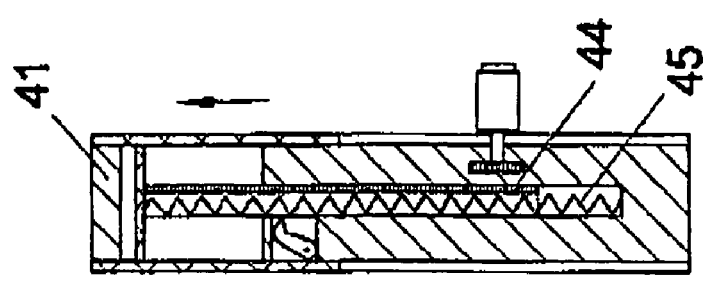
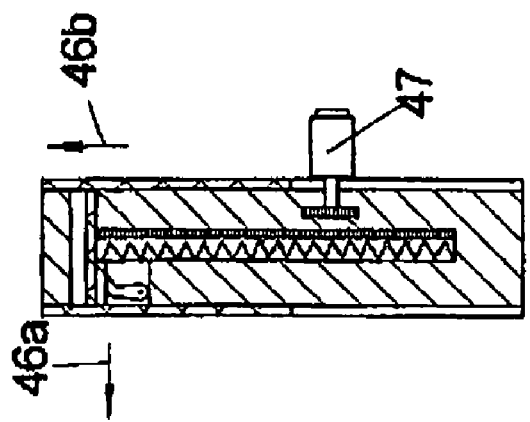
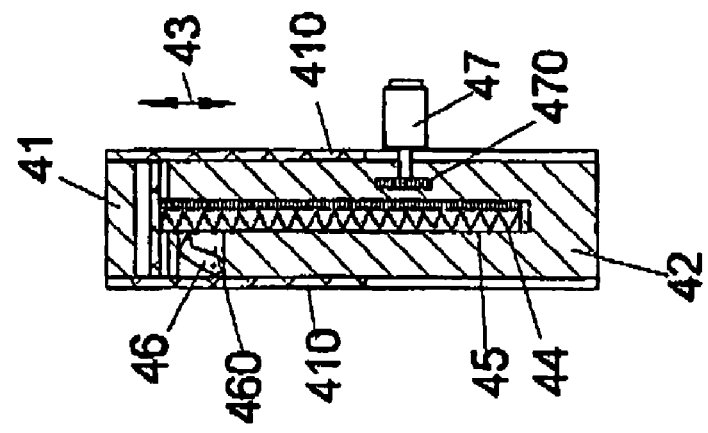

BELT HEIGHT ADJUSTMENT DEVICE

BACKGROUND

The invention relates to a height-adjustable, belt-deflecting device for a seat belt, in particular for a motor vehicle, having a belt-deflecting element which deflects the belt. Height-adjustable belt-deflecting devices of this type are also referred to as "height adjusters" for a seat belt and are conventionally fastened to the side body of the vehicle level with the shoulder of the vehicle occupant who is to be protected by the seat belt.

SUMMARY

The belt height adjustment device described herein addresses a need for a height-adjustable, belt-deflecting device for a seat belt, by means of which the safety of a vehicle occupant to be protected by the seat belt is improved.

Provision is made for the deflecting element to be connected to a tightening device with which the seat belt can be tightened.

One advantage of the height-adjustable, belt-deflecting device can be found in the fact that, owing to the tightening device, the seat belt can be tightened before and/or during an accident, as a result of which the seat belt is placed tightly against the vehicle occupant and positioned there; this pre-tightening ensures that the seat belt can fully deploy its protective function.

Another advantage of the height-adjustable, belt-deflecting device resides in the fact that the tightening device can be of relatively simple construction and can be very light in weight; this is because it acts merely on the deflecting element of the seat belt, which element is relatively light in weight and has little mass to be accelerated. The tightening device can, therefore, be dimensioned to be significantly smaller and lighter in weight than would be required, for example, if the tightening device had to act on a comparatively heavy belt retractor of the seat belt for the purpose of tightening the belt.

Provision is made for the tightening device to be composed so that it pulls or pushes the deflecting element essentially vertically upwards to tighten the seat belt. For example, three-point seat belts conventionally have a deflecting element level with the shoulder/chest region of the vehicle occupant, which element can be used to tighten the seat belt. Accordingly, it is proposed to arrange the tightening device on a deflecting element of this type, which is arranged at shoulder height, and to pull or push the latter vertically upwards for the purpose of tightening the seat belt.

The seat belt can be tightened particularly rapidly and strongly if the tightening device has a tightening spring which acts on the deflecting element to tighten the seat belt. It is therefore regarded as advantageous if the tightening device has a tightening spring of this type. The tightening speed and the tightening strength can be predetermined by appropriate dimensioning of the spring force of the tightening spring. With a tightening spring, a more rapid and stronger tightening of the seat belt can, in particular, be achieved than would be possible, for example, with a motor drive acting on the seat belt; at the very least, the motor would have to be of very large and powerful dimensions to achieve a comparable tightening speed and tightening strength.

The tightening spring may be a helical spring, as the tightening of the seat belt can be brought about in a simple and cost-effective manner with a helical spring.

To achieve a reversible operation of the tightening device, it is regarded as advantageous if the tightening device has a driving motor with which the tightening spring can be placed under a predetermined prestress. The provision of a driving motor configured for the tightening spring makes it possible to ensure that, after the prestressed tightening spring has been released for the first time, it can be reset back into its original, tightened state. In contrast with a pyrotechnic drive, for example, which can only be released a single time, a reversible or repeated operation of the tightening device can, therefore, be ensured with a tightening spring and associated driving motor.

The driving motor may be an electric motor, as an electric motor can be activated in a very simple manner.

The prestressing of the seat belt can be achieved in a structurally very simple manner if the deflecting element is connected to a rack in which a driving toothed wheel of the driving motor engages to prestress the tightening spring.

For the driving toothed wheel to be connected only to the rack when the tightening spring is to be tightened, it is regarded as advantageous if the driving toothed wheel is fastened on a driving shaft which can be displaced along its driving-shaft axis. With such an arrangement of the driving toothed wheel on a displaceable driving shaft, it can namely be achieved that, after the tightening spring has been stressed, the driving motor can be separated from the rack and the tightening spring, so that the tightening spring can be released without a reaction on the driving motor occurring or the latter being rotated at the same time.

In terms of structure, the electric motor may be arranged laterally next to the rack so that, by a lateral displacement of the driving shaft along the driving-shaft axis, the driving toothed wheel can be brought into engagement with the rack and conversely can be brought out of engagement with it.

In the case of such a lateral arrangement of the electric motor, the driving shaft may be essentially perpendicular with respect to the longitudinal axis of the rack.

To make it possible for the tightening process of the tightening spring to be activated electrically, it is regarded as advantageous if the lateral displacement of the driving shaft can be activated electrically. Such a displacement of the driving shaft can be achieved in a simple and, therefore, advantageous manner if there is an electric displacement device for the lateral displacement of the driving shaft.

To make it possible for the driving motor to be dimensioned to be as small as possible and for it to consume as little current as possible to tighten the tightening spring, it is regarded as advantageous if a gear is arranged between the driving shaft and the driving motor. A gear of this type preferably has a gear reduction of at least 1:100.

After the end of the tightening process and after separation of the electric motor from the tightening spring, to ensure that the tightening spring remains in its prestressed state, the tightening spring may be locked in its prestressed state by a locking device within the tightening device.

The locking device can be activated electrically to trigger the tightening process electrically. In particular, the locking device may, therefore, be able to be unlocked electrically.

Instead of a helical spring or a mechanical spring, the tightening spring may, for example, also be a compressed-air spring. To prestress a compressed-air spring of this type, a pump device, with which the compressed-air spring can be placed under pressure to prestress it, may be provided.

Instead of a pump device for filling the compressed-air spring, a compressed-air cartridge may also be provided as the compressed-air reservoir, the stored compressed air of which cartridge may be used to fill the compressed-air spring.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows an exemplary embodiment for a height-adjustable, belt-deflecting device according to an embodiment of the invention; and FIGS. 2A-2D show the manner in which the height-adjustable, belt-deflecting device of FIG. 1 is used to tighten the seat belt and, after such a tightening process, to reset it back into its original state.

DESCRIPTION

Figure 3:
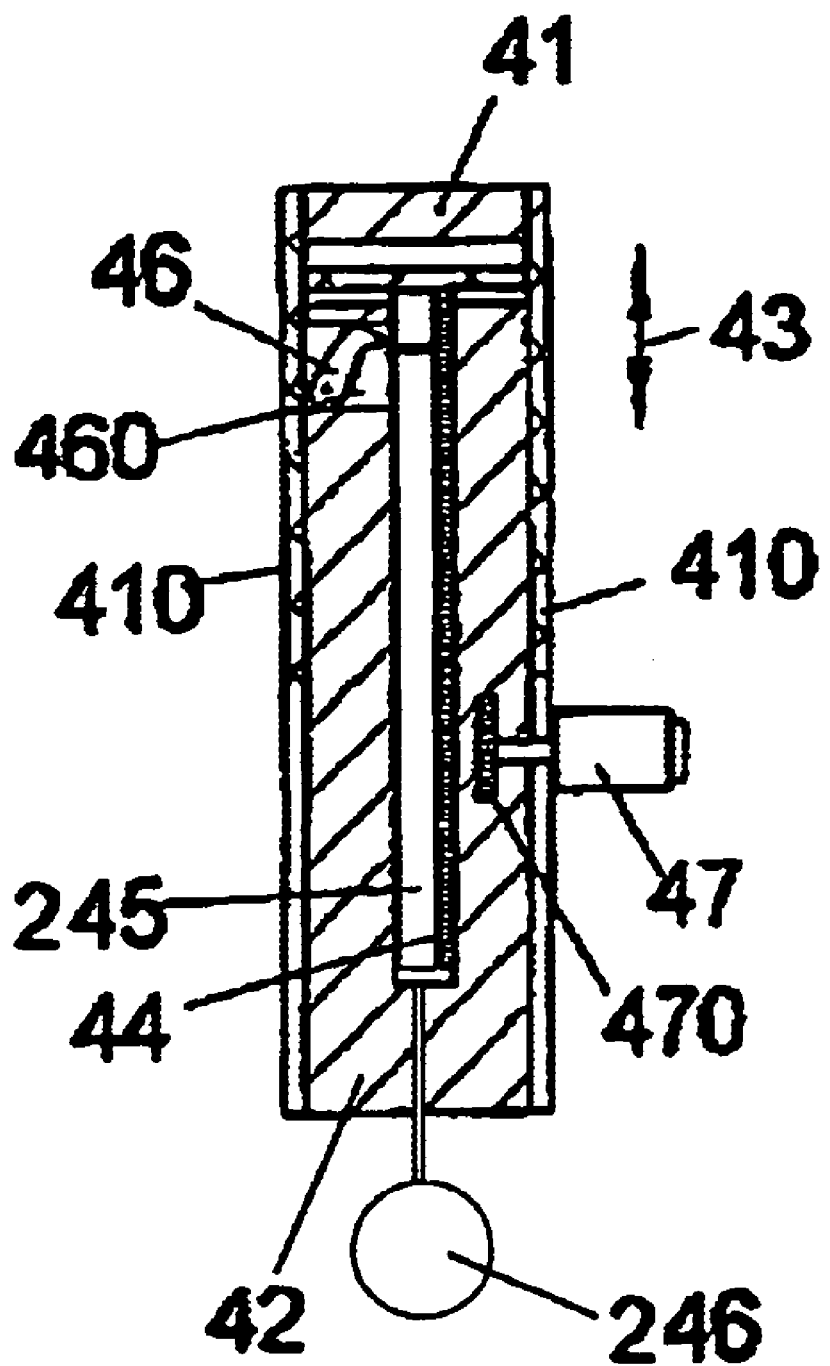
FIG. 3 shows another embodiment of the height-adjustable, belt deflecting device.

Presently preferred embodiments of the invention are illustrated in the drawings. An effort has been made to use the same, or like, reference numbers throughout the drawings to refer to the same or like parts.

In FIG. 1, a three-point seat belt 1 which is connected at its one end 11 to a belt retractor 2 can be seen. The other end 12 of the seat belt 1 is fastened to a belt end fitting 3.

The seat belt 1 runs from the belt retractor 2 via a deflecting element 41, a deflector 20, a deflecting buckle 5 and a further deflecting element 6 to the belt end fitting 3. The deflecting buckle 5 can be locked releasably in a belt latch mechanism 7 via a buckle latch 51.

The deflecting element 41 and the deflector 20 are parts of a height-adjustable, belt-deflecting device which is identified in FIG. 1 by the reference number 4. A double arrow 8 indicates that the deflecting element 41 of the height-adjustable, belt-deflecting device 4 can be moved vertically upwards and downwards. The seat belt 1 can therefore be tightened by moving the deflecting element 41. The vertical deflection or movement of the deflecting element 41 takes place indirectly or directly by means of an electric motor 47, the manner of operation of which is explained in detail in conjunction with FIGS. 2A-2D. The deflector 20 can be adjusted manually and serves to set the height of the belt-deflecting device 4.

The belt retractor 2, the belt end fitting 3, the further deflecting element 6 and the height-adjustable, belt-deflecting device 4 are attached to the side structure of the vehicle body; if the seat belt 1 is a three-point belt for an occupant who is situated in the front region of the vehicle, then the height-adjustable, belt-deflecting device 4, the belt retractor 2, the belt end fitting 3 and the further deflecting element 6 can be fastened in the region of the B-pillar 9 of the motor vehicle.

In the case of the exemplary embodiment of FIG. 1, only the upper deflecting element 41, which is arranged level with the shoulder or chest region of the vehicle occupant, is part of a height-adjustable, belt-deflecting device 4. Instead or else in addition, the further (lower) deflecting element 6 could also be provided with a corresponding, height-adjustable belt-deflecting device, so that the lap region 13 of the seat belt 1 could be tightened by a vertical displacement of the further (lower) deflecting element 6.

The manner of operation of the height-adjustable, belt-deflecting device 4 is illustrated in detail in FIGS. 2A-2D.

The deflecting element 41 which is fastened to a support 42 via lateral guide elements 410 can be seen in FIG. 2A; the deflecting element 41 is fastened to the support 42 so that the deflecting element 41 can be guided vertically upwards or downwards along the arrow direction 43.

The deflecting element 41 is connected rigidly to a rack 44 which extends into the support 42. A tightening spring 45, which is compressed and is, therefore, prestressed in the illustration of FIG. 2A, is fitted on the rack 44. The tightening spring may, for example, be a helical spring. Owing to this prestress, the tightening spring 45 exerts a vertically upwardly directed force on the rack 44 and the deflecting element 41.

In addition, a locking device 46 having a latching element 460 can be seen in FIG. 2A. The latching element 460 has a latching lug which engages laterally in the serrated profile of the rack 44. Owing to this engagement of the latching element 460, the rack 44 and the deflecting element 41 are fixed in the position illustrated in FIG. 2A.

FIG. 2B illustrates the manner in which the seat belt 1 of FIG. 1 can be stressed by the belt-deflecting device 4. Thus, an arrow 46a indicates the manner in which, by rotation of the latching element 460, the latching lug of the latching element 460 is brought out of engagement with the rack 44. In this position of the latching element 460, the spring force of the tightening spring 45 can act directly on the rack 44 and the deflecting element 41 and can push the deflecting element 41 vertically upwards along the arrow direction 46b.

FIG. 2C shows the tightened position which is brought about by the tightening spring 45 and in which the deflecting element 41 has reached its upper maximum position. In this position, the seat belt 1 is tightened so that the seat belt 1 bears firmly against the vehicle occupant, in particular in the shoulder/chest region.

If there should not be an accident or not a severe accident after such a tightening of the seat belt 1, then the deflecting element 41 is brought back into the activatable position of FIG. 2A. An electric motor 47 is used for this. The electric motor 47 has a driving toothed wheel 470 which can be brought into engagement with the rack 44. For this purpose, a driving shaft 471 connecting the driving toothed wheel 470 and the electric motor 47 is displaced laterally along its driving-shaft axis until the driving toothed wheel 470 comes into engagement with the rack 44. The displacement of the driving shaft 471 is indicated by an arrow 472 in FIG. 2D.

After the driving toothed wheel 470 has been brought into engagement with the rack 44, the corresponding activation of the electric motor 47 causes the rack 44 to be pulled downwards, which is indicated by the reference number 473 in FIG. 2D. The rack 44 is pulled downwards counter to the spring force of the tightening spring 45, so that the tightening spring 45 is placed under compressive stress when the rack 44 is lowered.

As can be gathered in addition from FIG. 2D, the latching lug of the latching element 460 is always in contact with the rack 44 as the deflecting element 41 is being pulled downwards; the latching element 460 is, therefore, configured so that it does not block a downwards movement along the arrow direction 473 of the rack 44 or deflecting element 41 and does not deploy an interfering action.

Only in the reverse direction, i.e., along the arrow direction of the arrow 46b of FIG. 2B, does the latching lug of the latching element 460 block the rack 44, so that the rack 44 remains in its position after the electric motor 47 is switched off. Even after the driving toothed wheel 470 has been pushed away counter to the arrow direction 472, i.e., in the direction of the electric motor 47 the rack 44 remains in the position blocked by the latching element 460. The tightening spring 45 cannot, therefore, push the rack 44 and therefore the deflecting element 41 upwards on account of the latching position of the latching lug of the latching element 460.

After the driving toothed wheel 470 has been pushed back again in the direction of the electric motor 47, the belt-deflecting device 4 is situated in the starting position which has already been explained in conjunction with FIG. 2A.

FIG. 3 shows another embodiment of the height-adjustable, belt deflecting device. Instead of a helical spring or a mechanical spring, the tightening spring may, for example, be a compressed-air spring 245. A pump device 246 may be provided with which the compressed-air spring 245 can be placed under pressure.

In summary, it can be established that the height-adjustable, belt-deflecting device 4 is completely reversible, as, after a first deflection of the deflecting element 41 upwards in the vertical direction, the said deflecting element 41 can be reset into the original initial position by the electric motor 47.

The priority application, Germany Patent Application 103 09 696.5, filed Feb. 26, 2003 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A height-adjustable, belt-deflecting device for a seat belt, the device comprising:
    a deflecting element which deflects the seat belt; and
    a tightening device with which the seat belt can be tightened,
    wherein the deflecting element is connected to the tightening device which allows the deflecting element to move,
    wherein the tightening device comprises a tightening spring and has a driving motor for placing the tightening spring under a predetermined prestress,
    wherein the driving motor is an electric motor,
    wherein the deflecting element is connected to a rack in which a driving toothed wheel of the driving motor engages to prestress the tightening spring,
    wherein the driving toothed wheel is fastened on a driving shaft which can be displaced along its driving-shaft axis, and
    wherein the electric motor is arranged laterally next to the rack so that, by a lateral displacement of the driving shaft along the driving-shaft axis, the driving toothed wheel can be brought into engagement with the rack and conversely can be brought out of engagement with it.

2. The device of claim 1, wherein the tightening device is configured so that it pulls or pushes the deflecting element essentially vertically upwards to tighten the seat belt.

3. The device of claim 1, wherein the tightening spring is formed by a helical spring.

4. The device of claim 1, wherein the driving shaft is essentially perpendicular with respect to the longitudinal axis of the rack.

5. The device of claim 1, wherein the lateral displacement of the driving shaft can be activated electrically.

6. The device of claim 5, wherein there is an electric displacement device for the lateral displacement of the driving shaft.

7. The device of claim 1, wherein a gear is arranged between the driving shaft and the driving motor.

8. The device of claim 1, wherein the tightening device has a locking device which locks the tightening spring in the prestressed state.

9. The device of claim 8, wherein the locking device can be activated electrically.

10. The device of claim 9, wherein the locking device can be unlocked electrically.

11. A height-adjustable, belt-deflecting device for a seat belt, the device comprising:
    a deflecting element which deflects the seat belt; and
    a tightening device with which the seat belt can be tightened,
    wherein the deflecting element is connected to the tightening device which allows the deflecting element to move,
    wherein the tightening device comprises a tightening spring and has a driving motor for placing the tightening spring under a predetermined prestress,
    wherein the driving motor is an electric motor,
    wherein the deflecting element is connected to a rack in which a driving toothed wheel of the driving motor engages to prestress the tightening spring,
    wherein the driving toothed wheel is fastened on a driving shaft which can be displaced along its driving-shaft axis,
    wherein a gear is arranged between the driving shaft and the driving motor, and
    wherein a gear reduction of the gear is at least 1:100.

12. A height-adjustable, belt-deflecting device for a seat belt, the device comprising:
    a deflecting element which deflects the seat belt; and
    a tightening device with which the seat belt can be tightened,
    wherein the deflecting element is connected to the tightening device which allows the deflecting element to move,
    wherein the tightening device comprises a tightening spring and has a driving motor for placing the tightening spring under a predetermined prestress, and
    wherein the tightening spring is a compressed-air spring.

13. The device of claim 12, wherein the driving motor is an electric motor.

14. The device of claim 13, wherein the deflecting element is connected to a rack in which a driving toothed wheel of the driving motor engages to prestress the tightening spring.

15. The device of claim 14, wherein the driving toothed wheel is fastened on a driving shaft which can be displaced along its driving-shaft axis.

16. The device of claim 12, wherein the compressed-air spring is connected to a pump device with which the compressed-air spring can be placed under pressure.

* * * * *